United States Patent [19]
Hull et al.

[11] Patent Number: 5,727,920
[45] Date of Patent: Mar. 17, 1998

[54] VERTICAL LIFT TOWING DOLLY INCLUDING VARIABLE, ATTACHABLE PLATFORMS

[76] Inventors: Harold Lawrence Hull, deceased, late of Sparks, Nev.; by Cathy D. Santa Cruz, Trustee, 401 Canyon Way, #43, Sparks, Nev. 89434; Jacques L. Cote; Robert B. Shelley, both of P.O. Box 10049, Zephyr Cove, Nev. 89448

[21] Appl. No.: 684,574

[22] Filed: Jul. 19, 1996

[51] Int. Cl.⁶ ............................................. B60P 3/00
[52] U.S. Cl. .................... 414/476; 280/490.1; 280/402; 280/43.19; 414/482; 414/563
[58] Field of Search .................... 414/482–485, 414/430, 563, 786, 537, 474–476; 280/402, 656, 490.1, 43.16, 43.17, 43.18, 43.19, 43.22

[56] References Cited

U.S. PATENT DOCUMENTS

| | | | |
|---|---|---|---|
| 3,018,906 | 1/1962 | Franklin | 280/43.19 X |
| 3,065,871 | 11/1962 | Schramm | 280/43.18 X |
| 3,427,041 | 2/1969 | Nichols | 280/43.18 |
| 3,494,630 | 2/1970 | Smith | 280/43.19 |
| 3,534,820 | 10/1970 | Groenke | 280/43.19 X |
| 3,624,786 | 11/1971 | Lundahl | 280/483 X |
| 3,734,540 | 5/1973 | Thiermann | 280/490.1 X |
| 3,746,195 | 7/1973 | Beilke et al. | 414/476 |
| 3,757,500 | 9/1973 | Averitt | 280/490.1 X |
| 3,764,031 | 10/1973 | Parsen | 414/485 |
| 3,811,697 | 5/1974 | Armstrong | 280/43.18 |
| 3,837,665 | 9/1974 | Schramm | 280/43.18 |
| 3,876,222 | 4/1975 | Thorsell | 280/43.19 |
| 3,921,842 | 11/1975 | Campbell | 414/430 X |
| 4,003,583 | 1/1977 | Stanzel | 280/42.22 |
| 4,077,643 | 3/1978 | Bates | 280/43.18 |
| 4,483,549 | 11/1984 | Nikawa | 414/563 X |
| 4,490,089 | 12/1984 | Welker | 414/483 |
| 4,921,390 | 5/1990 | Baines | 414/483 |
| 5,016,897 | 5/1991 | Kauffman | 414/485 X |
| 5,176,394 | 1/1993 | Veazey | 414/483 X |
| 5,308,213 | 5/1994 | Gilbertson | 414/482 |
| 5,362,195 | 11/1994 | Wagner | 414/483 |
| 5,387,001 | 2/1995 | Hull et al. | 414/430 X |
| 5,474,416 | 12/1995 | Rogge et al. | 414/482 |

FOREIGN PATENT DOCUMENTS 482830   6/1976   Australia .......................... 280/43.19

*Primary Examiner*—David A. Bucci

[57] ABSTRACT

The present invention has many inherent advantages, such as we provide "A VERTICAL LIFT TOWING DOLLY INCLUDING VARIABLE, ATTACHABLE PLATFORMS" with each platform being individually designed for a specific purpose, such as hauling a boat, car, motorcycle, etc. Also, a unique hydraulic one-man operated cable system allows for vertical lift of the entire frame. Also, this invention provides the following: an arrangement to selectively vary the distance between the wheels, a towing tongue removably affixed to the axle, an arrangement to accept variable sized trailer hitches, an arrangement to vary height of the trailer hitch and further the trailer may easily be assembled, as each of the components may be color coded and the trailer may be easily disassembled for transport and/or storage, or the like.

4 Claims, 4 Drawing Sheets

5,727,920

VERTICAL LIFT TOWING DOLLY INCLUDING VARIABLE, ATTACHABLE PLATFORMS

FIELD OF THE INVENTION

This invention relates to towing aids but more particularly relates to a towing aid which is a dolly having variable, attachable platforms and includes vertical lift means.

BACKGROUND OF THE INVENTION

In the past, a number of towing aids have been taught, such as U.S. Pat. No. 4,007,643 which provides means for lowering the front or rear portion of the trailer (not both simultaneously) while U.S. Pat. Nos. 3,837,665, 3,811,697, 3,746,195 and 3,494,630 each provide means for lowering the rear portion only of the trailer. U.S. Pat. Nos. 4,003,583 and 3,427,041 both provide vertical lift of the entire trailer bed, however to do so, these apparatus's include complicated and inefficient hydraulic lift systems.

The above noted references are functional for their intended use, however each have inherent drawbacks which the present invention addresses and solves. Furthermore, the present invention includes many inherent features and/or advantages heretofore not seen nor taught.

SUMMARY OF THE INVENTION

Within the present invention we provide many features and/or advantages, such as interchangeable platforms, means to selectively vary the distance between the wheels, a towing tongue removably affixed to the axle, means to accept variable sized trailer hitches and means to vary the height of the trailer hitch. Furthermore, the dolly and the platforms may be color coded for easy assembly and the entire apparatus is easily disassembled for storage, or the like.

It is therefore a primary object of the present invention to provide a towing dolly which acts as a base frame for variably attached platforms.

It is another object to provide a towing dolly which allows for selective, variable, adjustable distances between the wheels.

Yet another object is to provide a towing tongue which is removably affixed to the axle.

Still another object is to provide the tongue with means to accept and cooperate with variably sized trailer hitches.

Yet another object is to provide means to adjust the height of the trailer hitch in relation to the towing vehicle.

A further object is to provide variably sized platforms, each having a specific purpose and design, such as for hauling a car, a motorcycle, a boat, a snowmobile, jet-ski(s), a golf-cart, wire-spools, etc.

Still a further object is to provide a unique hydraulic one-man operated cable system for vertical lift of the dolly without tilting the frame.

Yet a further object is to provide a dolly and all of its additional components with the ability to be easily disassembled and stored in the trunk of your car, or in an RV compartment, or a shelf in your garage, etc.

Other objects and advantages will become apparent when taken into consideration with the following drawings and specifications.

DETAILED DESCRIPTION OF THE DRAWINGS

Figure 1:
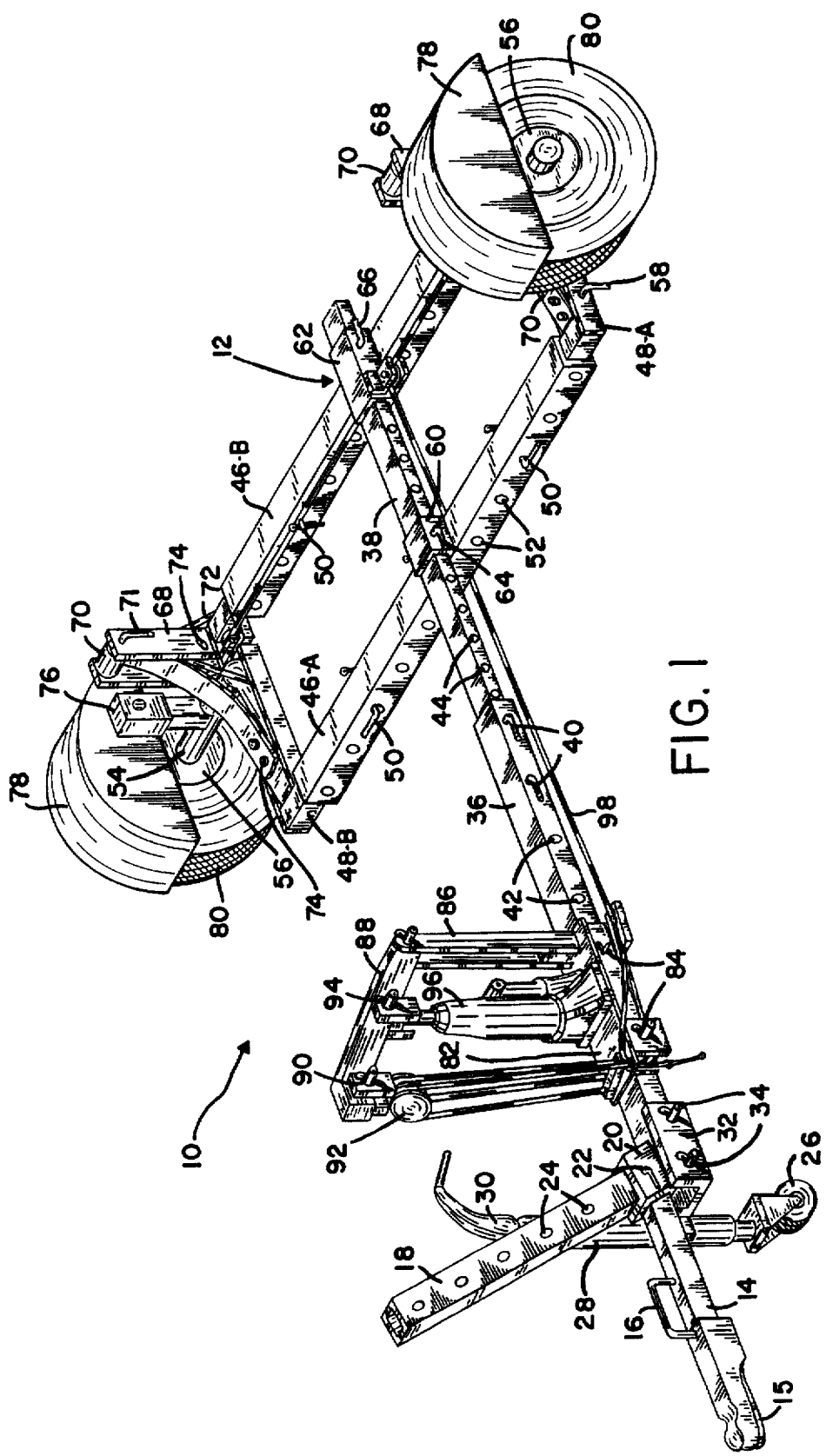
FIG. 1 is a perspective view of the preferred embodiment and shown in an elevated position.

Referring now in detail to the drawings wherein like characters refer to like elements throughout the various drawings, in FIG. 1, arrow (10) is an overview of the preferred embodiment with arrow (12) being in general a base frame to which various carrier attachments may be removably affixed with (14) being a vehicle attachment tongue having a first and a second end with a ball socket (15) and a handle (16) located substantially on the first end and (18) being substantially a first upright member on the second end to adjustably support the second end of the vehicle attachment tongue (14) through the sliding member (20) which is substantially a section of a square tubular structure to adjustably affix the second end of the tongue (14) to the first upright member (18) and held in place by pin (22) through holes (24). (26) is a wheel with a support structure (28) having lifting means, such as crank (30), which turns an internal screw (not shown) for lifting the tongue (14) from a vehicle. The support structure (28) being pivotably attached to a U-shaped first member (32) which is adjustably held in place by pins (34) and attached to the first end of a first tongue section (36), respectively, of frame (12) with the second end of section (36) being adjustably attached to the first end of a second tongue section (38) of frame (12) by pins (40) through multiple holes (42) & (44), respectively. (46-A) & (46-B) are substantially a pair of parallel cross sections which are attachable to frame 12) by substantially a pair of square tubular structures 60) & (62) which in turn are held adjustably in place by pins (64) & (66), respectively. Cross sections (46-A) & (46-B) each having ends which are adjustably attachable to the first ends of a pair of elongated square shaped members (48-A) & (48-B) respectively, by pin 50 through holes (52) which allows for variable width adjustment. Axles (54) are substantially L-shaped members each having a short leg anchored to the wheel hubs (56) and a long leg which is removably attachable to the first ends of elongated square shaped members (48-A) & (48-B) by pins (58).

A pair of leaf springs (70) and a pair of upright leaf spring support structure (68) which are fixedly attached to the second ends of the elongated square shaped members (48-A) & (48-B), respectively, with the support structures (68) each having a pin (71) for attaching the first end of each leaf spring thereto, respectively, and each of the leaf springs (70) having a second end fixedly attached to the long leg of each axle (54), and an upright member (76) secures the wheel covers (78) to the axles (54) with the wheels being depicted by (80).

Member (82) is substantially in the form of an upside-down "U" which is removably attached to first tongue section (36) by pins (84), respectively and provides a base for an upright support (86) which is pivotably connected to cross member (88) which has on its opposite end, a pivotable support member (90) which supports a first pair of pulleys (92), respectively. The cross member (88) has substantially in its center, a pivotable member (94) which is pivotably attached to an integral part of a prior art lifting device, such as a hydraulic jack (96), which is secured in a suitable manner (such as by welding) to substantially the upside-down "U" shaped member (82).

Figure 2:
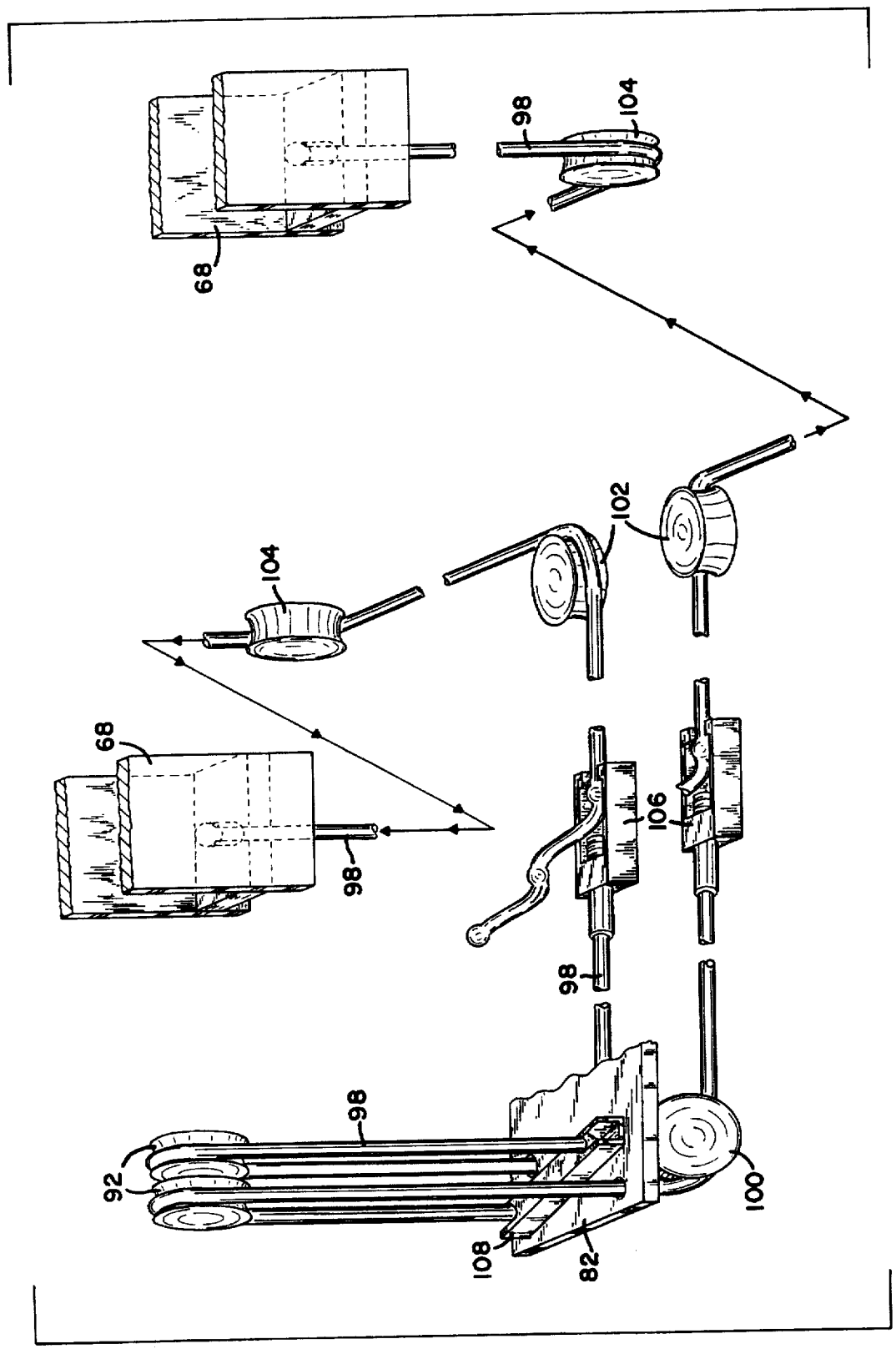
FIG. 2 is a schematic view of the cable system to lower and raise the base frame.

A cable system (98), (which is taught in detail in FIG. 2) consisting of a first pair of pulleys (92), a second pair of pulleys (100), a third pair of pulleys (102) and a fourth pair of pulleys (104), respectively, with each cooperating with a pair of cables (98) and a pair of cable adjusting blocks (106), and cables (98) each having a first end which terminates within each structure (68) and each have a second end which terminates within each cable block (108).

Figure 3:
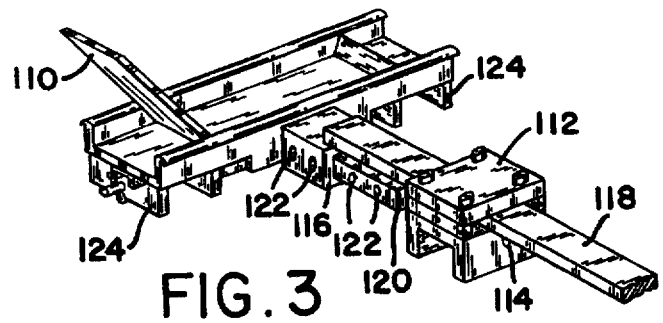
FIG. 3 is a partial perspective view of a pivotable car ramp.
Figure 5:
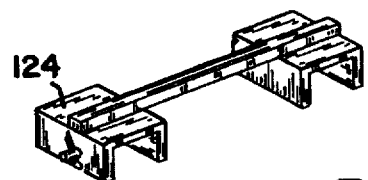
FIG. 5 is a perspective view of a support structure underneath the pivotable car ramp of FIG. 3.

Referring now to FIG. 3, wherein (110) is a car dolly front wheel mount (only one shown) which mounts to substantially the center of the second tongue section (38) through mounting assembly (112) which is held in place by a pin (not shown) through hole (114). A pair of Substantially square shaped members (116), (only one shown) are suitably attached (such as by welding) to the pivotable cross piece (118) and each cooperate with sliding bar (120) which is adjustably attached to the square shaped members (116) by pins (not shown) through holes (122). The front wheel mount assembly (110) has a slidable relationship with assembly (124) which is adjustably attached to the parallel cross sections (46-A) & (46-B) and allows the wheel mount assembly to pivot to allow cornering when towing.

Figure 7:
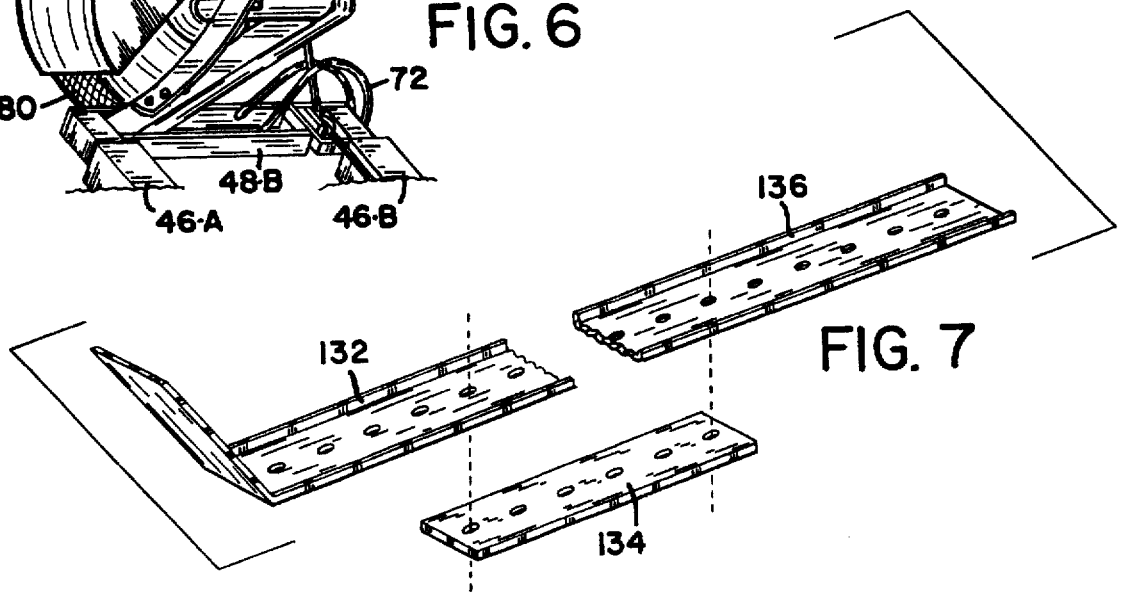
FIG. 7 is a perspective view of a motorcycle carrier.
Figure 4:
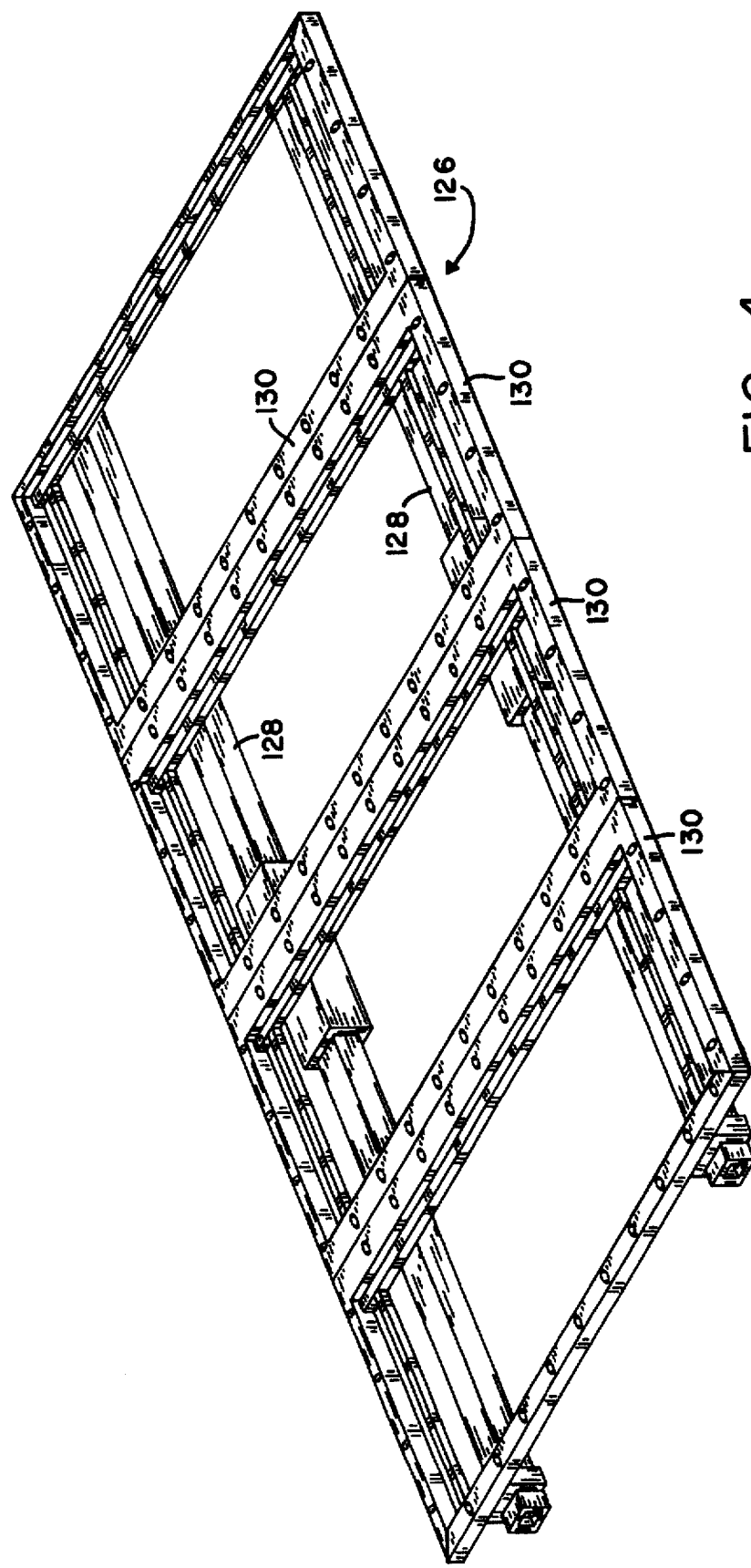
FIG. 4 is a perspective view of a flat bed frame attachable to the base frame.

The trailer may become a flat bed trailer (126) by bolting on various sections, such as is depicted in FIG. 4 (with no attempt being made to show the various hardware which might be used) with (128) being rails to accept panels (130) or the trailer may become a motorcycle or bicycle carrier by adding the structure as shown in FIG. 7 with members (132), (134) & (136), respectively.

The basic configuration of the overview (10) may be used as the base for many other carrier type embodiments and no attempt is made at this time to elaborate further on other uses.

It will now be noted that the various elements shown may be easily disassembled for storage or transport.

It will also be seen that we have herein provided a trailer which can be adjustable for width, hitch height, car width, etc.

It will further be seen that we have herein provided a trailer wherein the numerous components may be color coded for easy assembly thereof.

Figure 6:
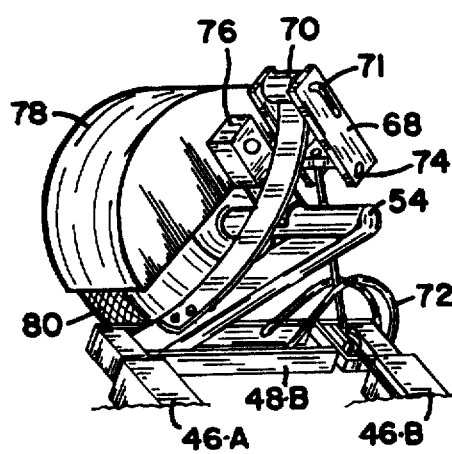
FIG. 6 is a perspective view of one of the wheels and its spring apparatus when in a lowered position.

It will also be noted that the unique hydraulic lowering and raising system in combination with the cable system, allows the entire trailer to be lowered to a first ground level position (see FIG. 6) and then raised to a level in a second position (see FIG. 1) suitable for travel and the system may be locked in place for further safety, also, tie-down means for each embodiment will be provided (not shown) and may take the form of chains and hooks.

MODE OF OPERATION

In use, at least the following steps should be followed;

a. assembling the trailer in the selected configuration;
b. adjusting the trailer hitch to the desired height;
c. removing locking means such as pins which allow the trailer to be lowered;
d. releasing the hydraulic pressure from the hydraulic system;
e. lowering the trailer to its first position at ground level;
f. adjusting the width of components if necessary;
g. driving or loading the vehicle to be transported onto the trailer;
h. tying down the vehicle to be transported onto the trailer;
i. raising the trailer to its second position with the hydraulic and cable system;
j. locking the trailer in its second position;
k. transporting the trailer and the vehicle to its new destination;
l. repeating steps c, d, and e; and
m. removing the vehicle from the trailer.

Although the invention has been herein shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatuses.

Having described the invention, what is claimed as new and desired to be secured by Letters Patent is:

1. A vertical lift towing dolly comprising: a base frame to which various carrier attachments may be removably affixed, a vehicle attachment tongue member having a first and a second end with a ball socket and a handle substantially on said first end, and a first upright member on a first end of a first tongue section of said base frame and adjacent said second end to adjustably support said second end of said vehicle attachment tongue member, a sliding member which is substantially a section of a square tubular structure to adjustably affix said tongue member to said first upright member, a support structure having a wheel and lifting means for lifting said tongue from a vehicle, said support structure having a U-shaped first member which is adjustably attached to said first end of a first tongue section of said base frame, said first tongue section having a second end adjustably attached to a first end of a second tongue section of said base frame, a pair of parallel cross sections each having substantially a central portion thereof which is attachable to said second tongue section by a pair of square tubular structures, said pair of cross sections each having ends which are adjustably attachable to first ends of a pair of elongated square shaped members, a pair of axles which are substantially L-shaped members each having a short leg anchored to wheel hubs and a long leg which is removably attachable to first ends of said pair of elongated square shaped members, a pair of upright leaf spring support structures fixedly attached to second ends of said elongated square shaped members, said support structures each having a pin for pivotably attaching each first end of a pair of leaf springs thereto, said leaf springs each having a second end fixedly attached to said long leg of said L-shaped members, a pair of upright members with each being fixedly attached to one of said short legs for attaching a wheel cover to each of said axles, an upside-down U-shaped structure which is removably attached to the first end of said first tongue section, respectively, and provides substantially a base for an upright support and a lifting device, a cross member having a first end which is pivotably connected to said upright support, said cross member having on its opposite end a pivotable support member which supports a first pair of pulleys, said cross member having substantially at its center section a support attachment member which supports and cooperates with said lifting device, and a cable system comprising: said first pair of pulleys, a second pair of pulleys attached and located substantially beneath said upside-down U-shaped member, a third pair of pulleys attached and located substantially upon one of said cross members, a fourth pair of pulleys attached and located substantially upon said ends of last said cross member, a first pair and a second pair of cables which cooperate with said pulleys, said first pair of cables each having a first end which terminates in a removably yet affixed manner within a cable support block mounted on said first tongue section substantially beneath said pivotal support member, said first pair of cables each having a second end which terminates in a removably yet adjustably affixed manner within a first end of a cable adjusting block, said second pair of cables each having a first end which terminates in a removably yet adjustably affixed manner within a second end of said cable adjusting block and said second pair of cables each having a second end which terminates in an affixed manner within said leaf spring support structures, whereby;
said cable system and said towing dolly cooperate together to allow said dolly to be vertically and horizontally adjustably positioned and locked in place in substantially any position of choice.

2. The towing dolly of claim 1 wherein said various carrier attachments includes a car carrier attachment comprising: an elongated slide bar having on each of its ends a substantially square tubular member with each being of a shape and size to slidably receive and attach one of said cross members, an attachment bracket having a groove substantially throughout it bottom surface for slidably receiving said elongated slide bar therein and having a pair of front wheel mounts fixedly attached to a pair of slide bars, a pair of substantially square shaped tubular members which adjustably slidably receive said pair of slide bars therein, said square shaped tubular members each being fixedly attached to one end of a pivotable cross member, a second tongue mounting assembly comprising; a substantially square tubular mounting bracket which is adjustably removably attachable to substantially the center portion of said second tongue member; a pair of space bars fixedly attached to substantially a top surface of said mounting bracket; a substantially square shaped attachment plate fixedly attached to substantially the top surface of said pair of space bars, thus said mounting bracket, said space bars and said plate each cooperate to form a space and said space being of a shape and size to slidably receive said pivotable cross member therethrough, whereby;
said car dolly when attached to said second tongue section allows the car dolly to pivot when being towed.

3. The towing dolly of claim 1 wherein said various carrier attachments includes a flatbed trailer attachment.

4. The towing dolly of claim 1 wherein said various carrier attachments includes a motorcycle carrier.

* * * * *